US009343750B2

(12) United States Patent
Lee et al.

(10) Patent No.: US 9,343,750 B2
(45) Date of Patent: May 17, 2016

(54) SUPPORTER FOR FUEL CELL, AND ELECTRODE FOR FUEL CELL, MEMBRANE-ELECTRODE ASSEMBLY FOR A FUEL CELL, AND FUEL CELL SYSTEM INCLUDING SAME

(71) Applicant: Samsung SDI Co., Ltd., Yongin-si (KR)

(72) Inventors: Sung-Chul Lee, Yongin-si (KR);
Jun-Young Kim, Yongin-si (KR);
Hee-Tak Kim, Yongin-si (KR);
Myoung-Ki Min, Yongin-si (KR);
Yong-Bum Park, Yongin-si (KR)

(73) Assignee: Samsung SDI Co., Ltd., Yongin (KR)

( * ) Notice: Subject to any disclaimer, the term of this patent is extended or adjusted under 35 U.S.C. 154(b) by 147 days.

(21) Appl. No.: 13/652,112

(22) Filed: Oct. 15, 2012

(65) Prior Publication Data
US 2013/0344414 A1 Dec. 26, 2013

Related U.S. Application Data

(60) Provisional application No. 61/664,600, filed on Jun. 26, 2012.

(51) Int. Cl.
*H01M 4/96* (2006.01)
*H01M 4/92* (2006.01)
*H01M 4/90* (2006.01)
*H01M 4/86* (2006.01)
(Continued)

(52) U.S. Cl.
CPC .............. *H01M 4/96* (2013.01); *H01M 4/9083* (2013.01); *H01M 4/921* (2013.01); *H01M 4/926* (2013.01); *B82Y 30/00* (2013.01); *H01M 4/8657* (2013.01); *H01M 4/8828* (2013.01); *H01M 4/8842* (2013.01); *H01M 4/925* (2013.01); *Y02E 60/50* (2013.01); *Y10S 977/773* (2013.01); *Y10S 977/948* (2013.01)

(58) Field of Classification Search
CPC .............................. H01M 4/96; H01M 4/9083
USPC ........................................................ 429/483
See application file for complete search history.

(56) References Cited

U.S. PATENT DOCUMENTS

2005/0112451 A1* 5/2005 Lee et al. ........................ 429/44
2007/0099069 A1   5/2007 Min et al.
(Continued)

FOREIGN PATENT DOCUMENTS

EP        1883131 A1    1/2008
JP     2008-181696 A    8/2008
(Continued)

OTHER PUBLICATIONS

Extended European Search Report issued Oct. 17, 2013 in EP 12190605.1, which corresponds to the present application.
(Continued)

*Primary Examiner* — Stewart Fraser
*Assistant Examiner* — Olatunji Godo
(74) *Attorney, Agent, or Firm* — Knobbe Martens Olson & Bear LLP

(57) ABSTRACT

Disclosed are a supporter for a fuel cell, and an electrode for a fuel cell, a membrane-electrode assembly, and a fuel cell system including the same. The supporter includes a transition metal oxide coating layer formed on a surface of a carbonaceous material, the surface of the carbonaceous material covalently bonded with the transition metal oxide.

10 Claims, 14 Drawing Sheets

(51) Int. Cl.
*H01M 4/88* (2006.01)
*B82Y 30/00* (2011.01)

(56) References Cited

U.S. PATENT DOCUMENTS

| | | | |
|---|---|---|---|
| 2007/0264189 A1* | 11/2007 | Adzic et al. | 423/604 |
| 2008/0206625 A1* | 8/2008 | Hasegawa | 429/44 |
| 2008/0233402 A1* | 9/2008 | Carlson et al. | 428/408 |
| 2009/0029221 A1* | 1/2009 | Goddard et al. | 429/30 |
| 2009/0081528 A1 | 3/2009 | Nakano et al. | |
| 2010/0209804 A1* | 8/2010 | Shin et al. | 429/483 |
| 2010/0221526 A1 | 9/2010 | Ueno et al. | |
| 2011/0151354 A1 | 6/2011 | Jin et al. | |

FOREIGN PATENT DOCUMENTS

| | | |
|---|---|---|
| KR | 10-0729154 B1 | 6/2007 |
| KR | 10-2007-0120346 A | 12/2007 |
| KR | 10-2010-0040974 A | 4/2010 |
| WO | WO 2008/070482 * | 6/2008 |

OTHER PUBLICATIONS

Communication pursuant to Article 94(3) EPC issued in EP 12 190 605.1-1359, which corresponds to the present application.

Communication pursuant to Article 94(3) EPC issued Jun. 6, 2015 in EP 12190605.1, which corresponds to the present application.

* cited by examiner

SUPPORTER FOR FUEL CELL, AND ELECTRODE FOR FUEL CELL, MEMBRANE-ELECTRODE ASSEMBLY FOR A FUEL CELL, AND FUEL CELL SYSTEM INCLUDING SAME

CROSS-REFERENCE TO RELATED APPLICATIONS

This application claims priority to and the benefit of U.S. Provisional Patent Application No. 61/664,600 filed in the U.S. Patent and Trademark Office on Jun. 26, 2012, the entire contents of which are incorporated herein by reference.

BACKGROUND

1. Field

The disclosure relates to a supporter for a fuel cell, and an electrode, a membrane-electrode assembly, and a fuel cell system including the same.

2. Description of the Related Technology

A fuel cell is a power generation system for producing electrical energy through a chemical reaction between an oxidant and hydrogen from a hydrocarbon-based material such as methanol, ethanol, or natural gas. Such a fuel cell is a clean energy source with the potential to replace fossil fuels.

Fuel cells include a stack composed of unit cells, each configured to produce various ranges of power. Since a fuel cell has about four to ten times higher energy density than a small lithium battery, it has been highlighted as a small portable power source.

Typical examples of fuel cells include polymer electrolyte membrane fuel cells (PEMFC) and direct oxidation fuel cells (DOFC). A direct oxidation fuel cell that uses methanol as a fuel is called a direct methanol fuel cell (DMFC). The PEMFC has an advantage of high energy density and high power, and a DOFC has lower energy density than that of the polymer electrolyte fuel cell, but it has the advantages of easy handling of a fuel, being capable of operating at room temperature due to its low operation temperature, and no need for additional fuel reforming processors.

In the above-mentioned fuel cell systems, the stack that generates electricity includes several to scores of unit cells stacked adjacent to one another. Each unit cell is formed from a membrane-electrode assembly (MEA) and a separator (also referred to as a bipolar plate). The MEA is composed of an anode (also referred to as a "fuel electrode" or an "oxidation electrode") and a cathode (also referred to as an "air electrode" or a "reduction electrode") separated by a polymer electrolyte membrane. Fuel is supplied to the anode and adsorbed on catalysts of the anode. The fuel is oxidized to produce protons and electrons. The electrons are transferred into the cathode via an external circuit, and the protons are transferred into the cathode through the polymer electrolyte membrane. In addition, an oxidant is supplied to the cathode, and then the oxidant, protons, and electrons react on catalysts of the cathode to produce both electricity and water.

SUMMARY OF CERTAIN INVENTIVE ASPECTS

In one aspect, a supporter for a fuel cell exhibiting good stability is provided.

In another aspect, an electrode for a fuel cell including a supporter is provided.

In another aspect, a membrane-electrode assembly for a fuel cell including an electrode is provided.

In another aspect, a fuel cell system including a membrane-electrode assembly is provided.

In another aspect, a supporter for a fuel cell is provided including, for example, a carbonaceous material and a transition metal oxide coating layer formed on a surface of the carbonaceous material.

In some embodiments, the surface of the carbonaceous material is covalently bonded with the transition metal oxide and the transition metal oxide has an average particle size of about 1.5 nm to about 10 nm. In some embodiments, the carbonaceous material may be at least one of graphite, denka black, ketjen black, acetylene black, carbon nanotubes, carbon nanofiber, carbon nanowire, carbon nanoballs, and activated carbon. In some embodiments, the transition metal oxide may be selected from the group including $ZrO_2$, $SnO_2$, $WO_3$, $TiO_2$, $InO_2$, SnO, or a combination thereof. In another embodiment, the transition metal oxide is a composite metal oxide including at least two of Zr, Sn, W, Ti, and In. In some embodiments, the amount of the transition metal oxide may be between about 4 wt % to about 96 wt % based on 100 wt % of the supporter.

In another aspect, a supporter and an active metal supported on the supporter is provided.

In some embodiments, the active metal may be at least one selected from the group including platinum, ruthenium, osmium, a platinum/ruthenium alloy, a platinum/osmium alloy, a platinum/palladium alloy, a platinum/M alloy (M is a transition element of Ga, Ti, V, Cr, Mn, Fe, Co, Ni, Cu, Zn, Sn, Mo, W, Rh, Ru, or a combination thereof), or a combination thereof.

In another aspect, an electrode for a fuel cell including a catalyst layer on an electrode substrate, the catalyst layer including a supporter is provided.

In another aspect, a membrane-electrode assembly for a fuel cell is provided that includes a cathode and an anode, an electrode of the present disclosure formed as at least one of the cathode and the anode. In some embodiments, the cathode and anode are positioned facing each other with a polymer electrolyte membrane interposed between the cathode and the anode.

In another aspect, a fuel cell system is provided that includes at least one electricity generating element including a membrane-electrode assembly and separators positioned at each side of the membrane-electrode assembly, a fuel supplier, and an oxidant supplier. In some embodiments, the electricity generating element is configured to generate electrical energy through oxidation of a fuel and reduction of an oxidant. In some embodiments, the fuel supplier is configured to supply fuel to the electricity generating element and the oxidant supplier is configured to supply the oxidant to the electricity generating element.

In another aspect, a supporter for a fuel cell is configured to provide a catalyst exhibiting superior stability, activity, and/or cycle-life characteristics.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION OF CERTAIN INVENTIVE EMBODIMENTS

Figure 1:
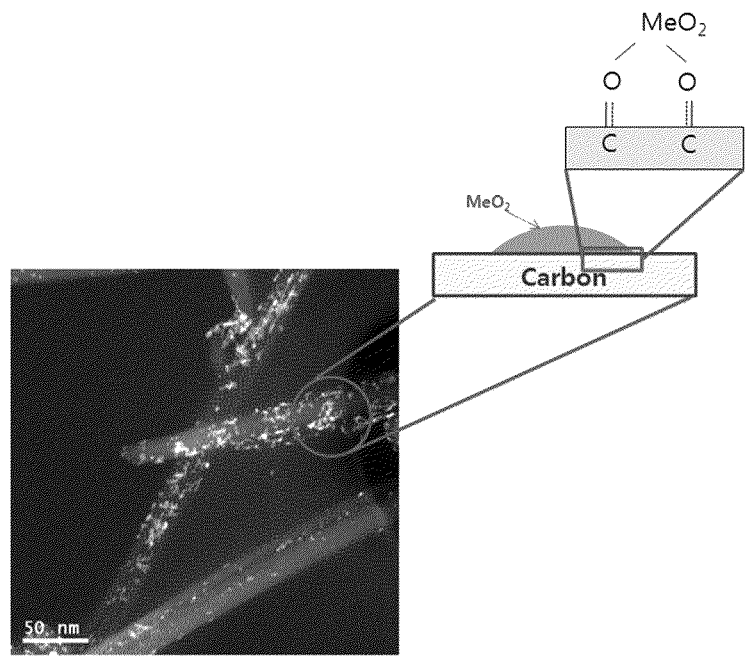
FIG. 1 is a SEM photograph of the supporter for a fuel cell and a schematic view showing a supporter according to one embodiment.

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A supporter for a fuel cell may include, for example a carbonaceous material and a transition metal oxide coating layer on a surface of the supporter. In some embodiments, the transition metal oxide has an average particle size about 1.5 nm to about 10 nm. The carbonaceous material and the transitional metal oxide are covalently bonded.

FIG. 1 is a SEM photograph of a supporter for a fuel cell and a schematic view showing the structure of the supporter.

The carbonaceous material may include one or more of graphite, denka black, ketjen black, acetylene black, carbon nanotubes, carbon nanofiber, carbon nanowire, carbon nanoballs, and activated carbon.

The transition metal oxide may include one or more of $ZrO_2$, $SnO_2$, $WO_3$, $TiO_2$, $InO_2$, $SnO$, or a combination thereof, and the composite metal oxide includes at least two of Zr, Sn, W, Ti, or In. The transition metal oxide may have an average size of about 1.5 nm to about 10 nm. In some embodiments, the transition metal oxide has an average size of about 1, 1.5, 2, 2.5, 3, 3.5, 4, 4.5, 5, 5.5, 6, 6.5, 7, 7.5, 8, 8.5, 9, 9.5, 10, 10.5 and 11 nm or any range in between these values.

The amount of the transition metal oxide may be about 4 wt % to about 96 wt % (e.g. about 4 wt % to 96 wt %) based on 100 wt % of the total supporter, and in another embodiment, about 30 wt % to 50 wt %. In some embodiments, the transition metal oxide may be about 5 wt % to about 95 wt %; about 10 wt % to about 90 wt %; about 20 wt % to about 80 wt %; about 30 wt % to about 70 wt %; about 40 wt % to about 60 wt % based on 100 wt % of the total supporter or any range in between any of the above listed values. When the amount of the transition metal oxide falls in the above ranges, the supporter exhibits good stability and electrical conductivity.

The amount of transition metal oxide may be optionally between about 10 wt % to about 90 wt %, or about 15 wt % to about 85 wt %, such as about 20 wt % to about 70 wt %, (e.g. about 25 wt % to about 60 wt %).

The supporter according to one embodiment includes the coating layer having the carbonaceous material and metal oxide. It thus may have advantages including, for example, high conductivity owing to the carbonaceous material and thermal/electrochemical stability owing to the metal oxide. In particular, since the carbonaceous material and the metal oxide are covalently bonded, it is advantageous for preventing separation of the metal oxide from the supporter while working for a long time.

Another embodiment provides a method of preparing the supporter. In the method, a metal oxide precursor and a carbonaceous material are mixed with a solvent. The solvent may be, for example, ethanol, water, isopropyl alcohol, or a combination thereof. The carbonaceous material may be oxidized by acids. The acid may be, for example, nitric acid, sulfuric acid, or a combination thereof. The oxidization may include mixing/refluxing the carbonaceous material and the acid and then washing/drying. The acid used may have a concentration of about 0.1 M to about 3 M. According to this process, a "—OH" or "—O" functional group is bonded to a surface of the carbonaceous material.

The transition metal precursor may be a transition metal-included acetylacetonate, acetate, chloride, or a combination thereof. The transition metal may be, for example, Zr, Sn, W, Ti, In, or a combination thereof.

The carbonaceous material may include graphite, denka black, ketjen black, acetylene black, carbon nanotubes (single-wall carbon nanotubes or multi-wall carbon nanotubes), carbon nanofiber, carbon nanowire, carbon nanoballs, or activated carbon. Suitably, the carbonaceous material may be selected from carbon nanotubes, carbon nanofiber, carbon nanowire, or a combination thereof.

A mixing ratio of the transition metal precursor and the carbonaceous material may be from about 4:96: to about 96:4 wt %. In some embodiments, the mixing ratio of the transition meal to the carbonaceous material may be about 5:95 to about 95:5 wt %; about 10:90 to about 90:10 wt %; about 20:80 to about 80:20 wt %; about 30:70 to about 70:30 wt %; about 40:60 to about 60:40 wt %; or any range between any of the above listed ratios. For example, in another embodiment, the mixing ratio of the transition metal precursor and the carbonaceous material may be from 30:70 to 50:50 wt %. When the mixing ratio of the transition metal precursor and the carbonaceous material is out of the above range, i.e., the amount of the transition metal precursor decreases, sufficient durability cannot be obtained. Furthermore, as the amount of the transition metal precursor increases, the electrical conductivity may be reduced.

The mixing ratio may be performed at about 90° C. to about 200° C. The mixing ratio at the above temperature allows rapid synthesis and termination reaction, thereby reducing the particle size.

According to the above procedure, the transition metal precursor adheres to a surface of the carbonaceous material and is converted into a transition metal alkoxide. Particularly, if the carbonaceous material oxidized with acid is used, the transition metal precursor reacts with the "—OH" or "—O" functional group on the surface of the carbonaceous material to adhere to the surface of the carbonaceous material, thereby converting the transition metal alkoxide.

Another embodiment provides a catalyst for a fuel cell including the supporter and an active metal supported on the supporter.

The active metal may be selected from platinum, ruthenium, osmium, a platinum/ruthenium alloy, a platinum/osmium alloy, a platinum/palladium alloy, a platinum/M alloy (M is a transition element of Ga, Ti, V, Cr, Mn, Fe, Co, Ni, Cu, Zn, Sn, Mo, W, Rh, Ru, or a combination thereof), or a combination thereof. The catalyst according to another embodiment may be used for an anode and/or a cathode. The catalyst may be the same regardless of whether it is used in the anode or the cathode. However, a polymer electrolyte fuel cell may optionally include a platinum-ruthenium alloy as the active metal as an anode catalyst in order to prevent catalyst poisoning due to CO when the reformed fuel is used. Specific examples of the catalyst include Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and a combination thereof, but are not limited thereto.

The method of supporting the active metal on the supporter is well-known in the related field, and a detailed description thereof is omitted.

Another embodiment provides an electrode for a fuel cell including a catalyst layer having the catalyst and an electrode substrate.

The catalyst layer may optionally further include a binder resin to improve its adherence and proton transfer properties. The binder resin (referred as "ionomer") may be optionally a proton conductive polymer resin having a cation exchange group selected from the group including a sulfonic acid group, a carboxylic acid group, a phosphoric acid group, a phosphonic acid group, and derivatives thereof at its side chain.

Examples of the proton conductive polymer resin include at least one proton conductive polymer selected from the group including a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, or a polyphenylquinoxaline-based polymer.

In one embodiment, the proton conductive polymer is at least one selected from the group including poly(perfluorosulfonic acid), poly(perfluorocarboxylic acid), a sulfonic acid-containing copolymer of tetrafluoroethylene and fluorovinylether, polyetherketone sulfide, an aryl ketone, poly(2,2'-m-phenylene)-5,5'-bibenzimidazole, and poly(2,5-benzimidazole).

The hydrogen (H) in the cation exchange group of the proton conductive polymer may be optionally substituted with Na, K, Li, Cs, or tetrabutylammonium. When the H in the cation exchange group of the terminal end of the proton conductive polymer side chain is substituted with Na or tetrabutylammonium, NaOH or tetrabutylammonium hydroxide may be optionally used during preparation of the catalyst composition, respectively. When the H is substituted with K, Li, or Cs, a suitable compound for the substitution may be used. Since such a substitution is known in this art, a detailed description thereof is omitted.

The binder resins may be used singularly or in combination. They may be optionally used along with non-conductive polymers to improve adherence with a polymer electrolyte membrane. The binder resins may be used in a controlled amount to adapt to their purposes.

Examples of the non-conductive polymers include at least one selected from the group including polytetrafluoroethylene (PTFE), a tetrafluoroethylene-hexafluoropropylene copolymer (FEP), a tetrafluoroethylene-perfluoroalkylvinylether copolymer (PFA), an ethylene/tetrafluoroethylene copolymer (ETFE), an ethylenechlorotrifluoro-ethylene copolymer (ECTFE), polyvinylidenefluoride, a copolymer of polyvinylidenefluoride-hexafluoropropylene (PVdF-HFP), dodecylbenzenesulfonic acid, and sorbitol.

The electrode substrates are configured support the anode and cathode and provide a path for transferring the fuel and oxidant to catalyst layers. In one embodiment, the electrode substrates are formed from a material such as carbon paper, carbon cloth, carbon felt, or a metal cloth (a porous film composed of metal fiber or a metal film disposed on a surface of a cloth composed of polymer fibers). The electrode substrate is not limited thereto.

The electrode substrates may be treated with a fluorine-based resin to be water-repellent to prevent deterioration of reactant diffusion efficiency due to water generated during operation of a fuel cell.

Examples of the fluorine-based resin may include polytetrafluoroethylene, polyvinylidene fluoride, polyhexafluoropropylene, polyperfluoroalkylvinylether, polyperfluorosulfonylfluoride, alkoxyvinyl ether, fluorinated ethylene propylene, polychlorotrifluoroethylene, and copolymers thereof. The electrode for a fuel cell may further include a microporous layer to increase reactant diffusion effects of the electrode substrate. The microporous layer generally includes conductive powders with a particular particle diameter, for example carbon powder, carbon black, acetylene black, activated carbon, carbon fiber, fullerene, carbon nanotubes, carbon nanowire, carbon nanohorns, or carbon nanorings. The microporous layer is formed by coating a composition including a conductive powder, a binder resin, and a solvent on the electrode substrate.

The binder resin may optionally include polytetrafluoroethylene, polyvinylidenefluoride, polyhexafluoropropylene, polyperfluoroalkylvinylether, polyperfluorosulfonylfluoride, alkoxyvinyl ether, polyvinylalcohol, cellulo seacetate, a copolymer thereof, and the like. The solvent may be alcohol such as ethanol, isopropyl alcohol, n-propyl alcohol, butyl alcohol; water; dimethylacetamide, dimethylsulfoxide, N-methylpyrrolidone, tetrahydrofuran.

The coating method used may be selected from, but is not limited to, screen printing, spray coating, doctor blade methods, gravure coating, dip coating, silk screening, painting, and so on, depending on the viscosity of the composition.

According to another embodiment, a membrane-electrode assembly for a fuel cell including an electrode of the present disclosure as at least one of a cathode and an anode is provided.

The membrane-electrode assembly includes an anode and a cathode facing each other, and a polymer electrolyte membrane disposed between the anode and cathode. The polymer electrolyte membrane may include any kind generally used for a fuel cell, formed of a polymer resin, and having proton conductivity, without any particular limit.

Examples thereof may include a polymer resin having a cation exchange group selected from a sulfonic acid group, a carboxylic acid group, a phosphoric acid group, a phosphonic acid group, and derivatives thereof, at the side chain. Examples of the polymer resin may include at least one selected from a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, and a polyphenylquinoxaline-based polymer.

Preferred examples include poly(perfluorosulfonic acid) (generally, commercially available as Nafion), poly(perfluorocarboxylic acid), a copolymer of tetrafluoroethylene having a sulfonic acid group and fluorovinylether, defluorinated polyetherketone sulfide, aryl ketone, poly(2,2'-(m-phenylene)-5,5'-bibenzimidazole, poly(2,5-benzimidazole), and the like.

The hydrogen (H) may be substituted with Na, K, Li, Cs, or tetrabutylammonium in a proton conductive group of the proton conductive polymer. When the hydrogen (H) is substituted with Na in an ion exchange group at the terminal end of the proton conductive group, NaOH is used. When the hydrogen (H) is substituted with tetrabutylammonium, tributylammonium hydroxide is used. K, Li, or Cs may also be substituted with use of appropriate compounds.

A method of substituting hydrogen (H) is known in the related art, and therefore is not further described in detail. In addition, the proton conductive polymer including substituted Na, K, Li, Cs, or tetrabutylammonium may be converted into a proton type during the acid treatment of a catalyst layer.

According to another embodiment, a fuel cell system including at least one electricity generating element, a fuel supplier, and an oxidant supplier is provided. The electricity generating element includes a membrane-electrode assembly of the present disclosure and a separator (referred to as a "bipolar plate"). The electricity generating element is configured to generate electrical energy through oxidation of a fuel and reduction of an oxidant.

Furthermore, the fuel supplier is configured to supply the fuel to the electricity generating element and the oxidant supplier is configured to supply the oxidant such as air or oxygen to the electricity generating element. In one embodiment, the fuel may include hydrogen or a hydrocarbon fuel in the form of a gas or liquid. Examples thereof may include methanol, ethanol, propanol, butanol, natural gas, and the like.

Figure 2:
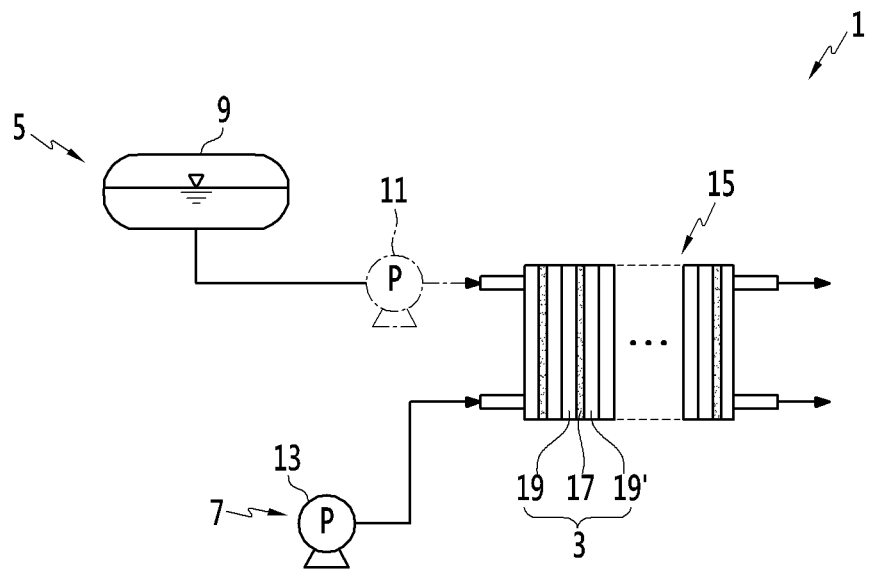
FIG. 2 is a schematic view showing the structure of a fuel cell system according to one embodiment.

The schematic structure of a fuel cell system is shown in FIG. 2, which will be described in detail with reference to this accompanying drawing as follows. FIG. 2 shows a fuel cell system configured to supply a fuel and an oxidant to an electricity generating element using a pump, but the fuel cell system according to the embodiment is not limited to such structures.

The fuel cell system alternately includes a structure wherein a fuel and an oxidant are provided in a diffusion manner without a pump. The fuel system 1 includes at least one electricity generating element 3 configured to generate electrical energy by oxidation of a fuel and reduction of an oxidant, a fuel supplier 5 configured for supplying the fuel, and an oxidant supplier 7 configured for supplying an oxidant to the electricity generating element 3.

In addition, the fuel supplier 5 is equipped with a tank 9, which is configured to store fuel, and a fuel pump 11, which is fluidly connected thereto. The fuel pump 11 is configured to supply fuel stored in the tank 9 with a predetermined pumping power. The oxidant supplier 7, which is configured to supply the electricity generating element 3 with an oxidant, is equipped with at least one oxidant pump 13 configured for supplying an oxidant with a predetermined pumping power.

The electricity generating element 3 includes a membrane-electrode assembly 17, configured to oxidize hydrogen or a fuel and reduce an oxidant, and separators 19 and 19' respectively positioned at opposite sides of the membrane-electrode assembly and configured to supply hydrogen or a fuel, and an oxidant, respectively.

A stack 15 is provided by stacking at least one electricity generating element 3.

The following examples illustrate the present disclosure in more detail. However, it is understood that the disclosure is not limited by these examples.

Reference Example 1

Zirconium (IV) acetylacetonate and carbon black (CB-1) were mixed under an ethanol solvent at 200° C. to produce a reaction. At this time, the mixing ratio of zirconium (IV) acetylacetonate and carbon black (CB-1) was about 12 wt %:88 wt %. The ethanol reduction provided a supporter with a zirconium oxide-included coating layer on a surface of the carbon black (CB-1), and the carbon black (CB-1) and zirconium oxide were covalently bonded.

Example 1

A supporter for a fuel cell was prepared by the same procedure as in Reference Example 1, except that the mixing ratio of zirconium (IV) acetylacetonate and carbon black (CB-1) was about 35 wt %:65 wt %.

Example 2

A supporter for a fuel cell was prepared by the same procedure as in Reference Example 1, except that the mixing ratio of zirconium (IV) acetylacetonate and carbon black (CB-1) was about 50 wt %:50 wt %.

Example 3

A supporter for a fuel cell was prepared by the same procedure as in Reference Example 1, except that the mixing ratio of zirconium (IV) acetylacetonate and carbon black (CB-1) was about 70 wt %:30 wt %.

Example 4

A supporter for a fuel cell was prepared by the same procedure as in Reference Example 1, except that the mixing ratio of zirconium (IV) acetylacetonate and carbon black (CB-1) was about 80 wt %:20 wt %.

Example 5

A supporter for a fuel cell was prepared by the same procedure as in Reference Example 1, except that crystalline carbon black (CB-500), which was prepared by heat-treating carbon black (CB-1) at 2000° C. was used instead of carbon black (CB-1).

Example 6

A supporter for a fuel cell was prepared by the same procedure as in Reference Example 1, except that crystalline carbon black (CB-1000), which was prepared by heat-treating carbon black (CB-1) at 2500° C. was used instead of carbon black (CB-1).

Determination of X-Ray Diffraction (XRD)

Figure 3:
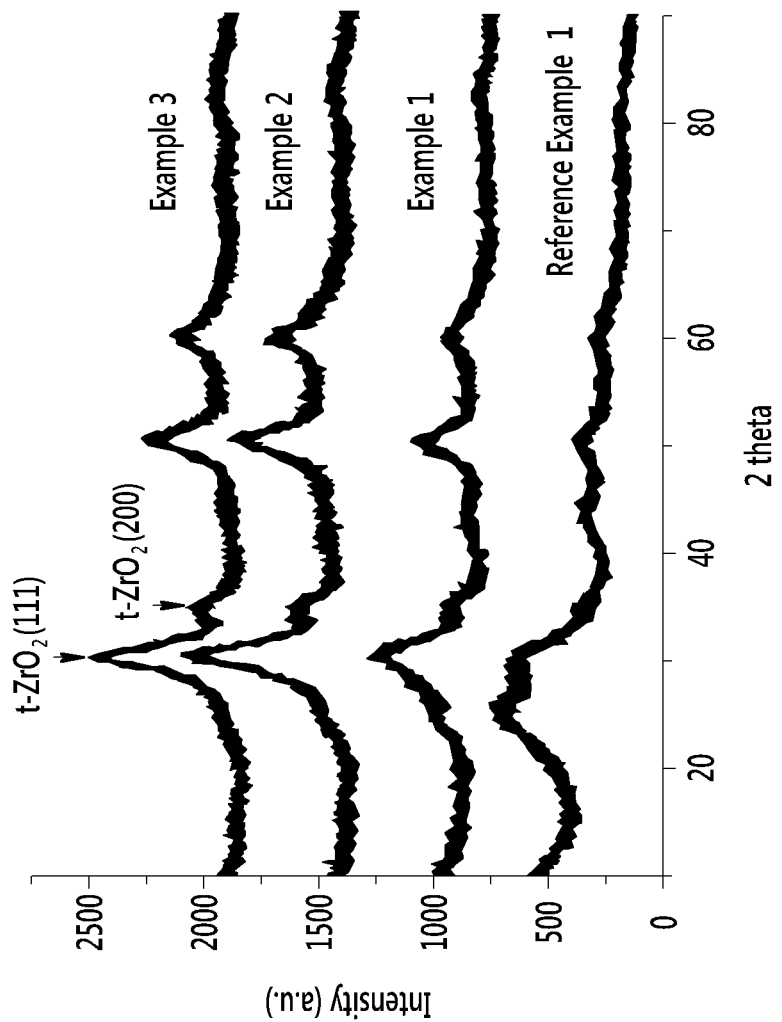
FIG. 3 is a graph showing X-ray diffraction results of the supporter according to Reference Example 1 and Examples 1 to 3.

The X-ray diffraction for the supporters according to Reference Example 1 and Examples 1 to 3 was measured using CuKα radiation. The results are shown in FIG. 3. As shown in FIG. 3, as the amount of zirconium (IV) acetylacetonate increases, the intensity of the peaks of t-$ZrO_2$ (200) and t-$ZrO_2$ (111) increases. It can be known from the result that the tetragonal structure is uniformly formed.

Measurements for Zirconium Oxide Particle Size

Figure 4:
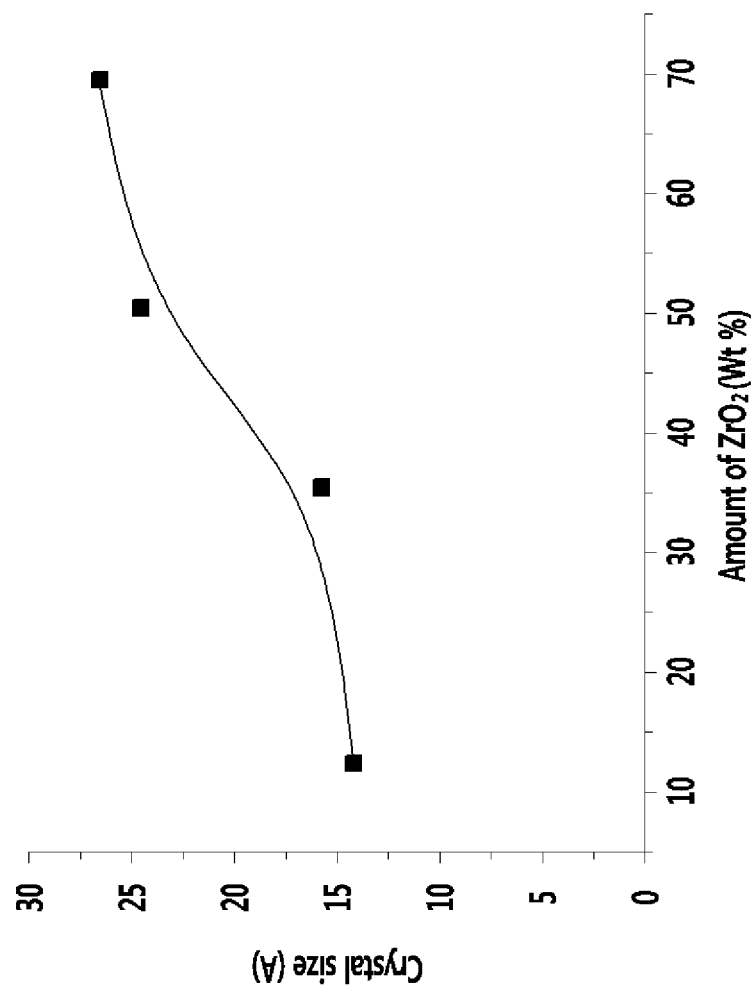
FIG. 4 is a graph showing a size of $ZrO_2$ in the supporter according to Reference Example 1 and Examples 1 to 3.
Figure 5:
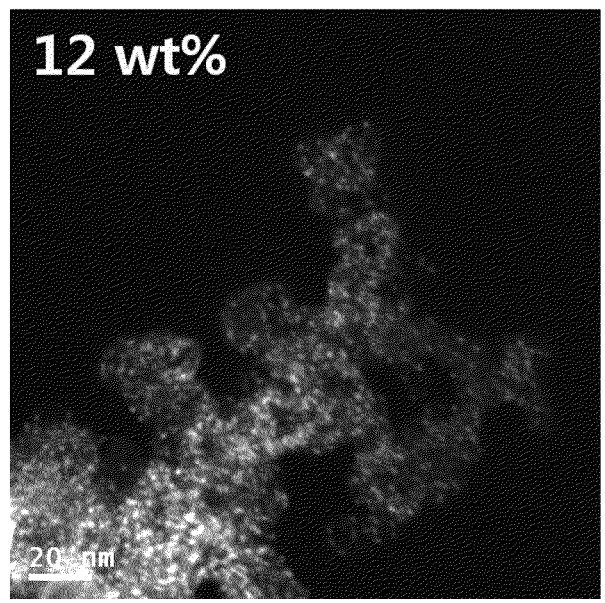
FIG. 5 is a TEM photograph of the supporter according to Reference Example 1.
Figure 6:
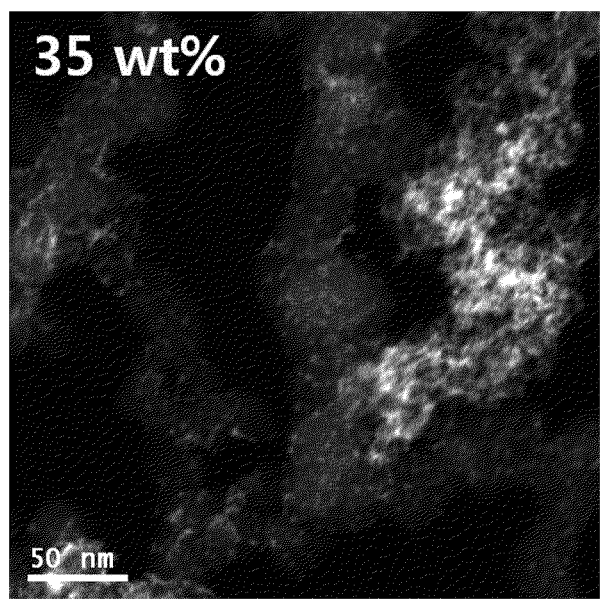
FIG. 6 is a TEM photograph of the supporter according to Example 1.
Figure 7:
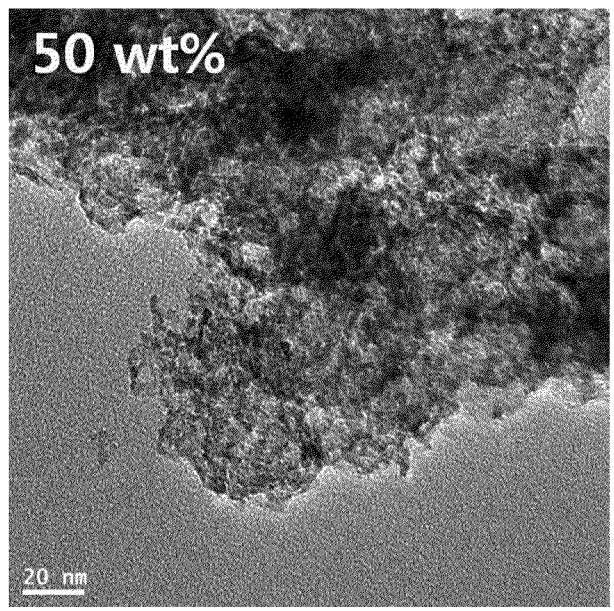
FIG. 7 is a TEM photograph of the supporter according to Example 2.
Figure 8:
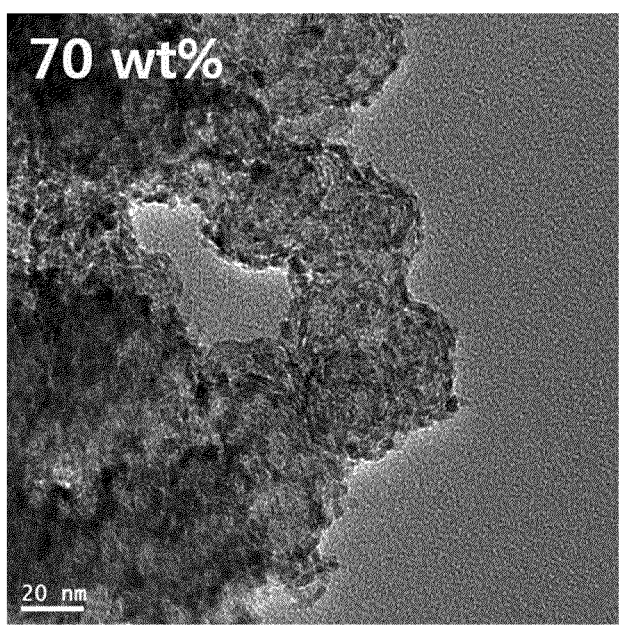
FIG. 8 is a TEM photograph of the supporter according to Example 3.
Figure 9:
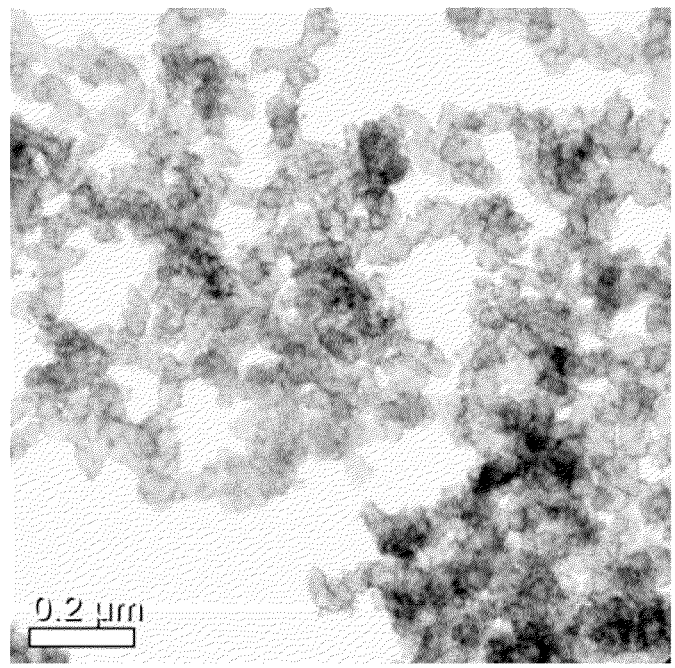
FIG. 9 is a 500,000-times enlarged TEM photograph of the catalyst according to Example 7.
Figure 10A:
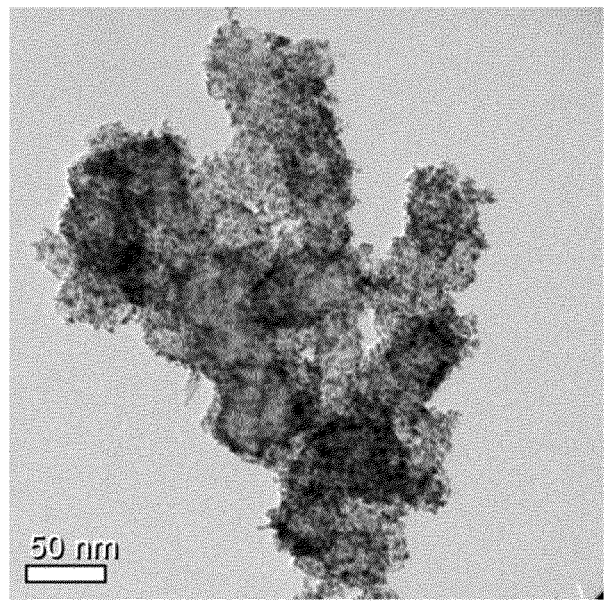
FIG. 10A to FIG. 10D are 500,000-times enlarged SEM photographs according to Example 7.
Figure 10B:
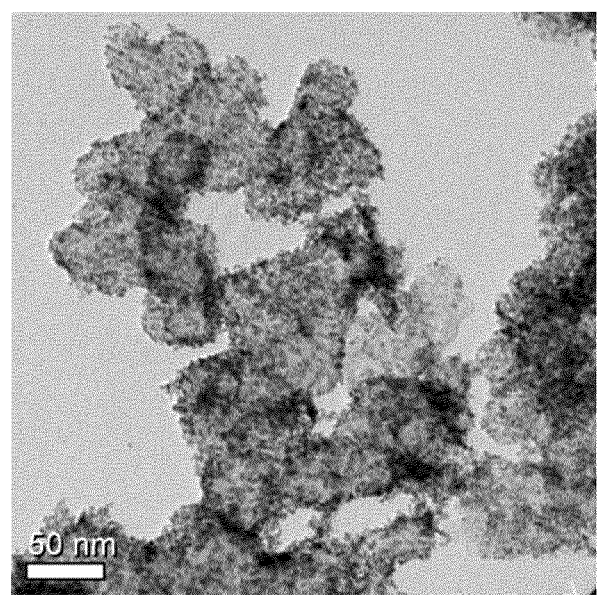
Figure 10C:
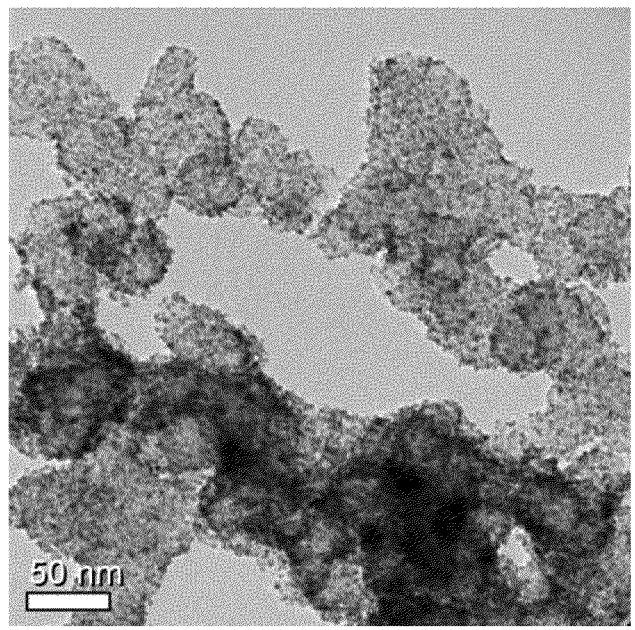
Figure 10D:
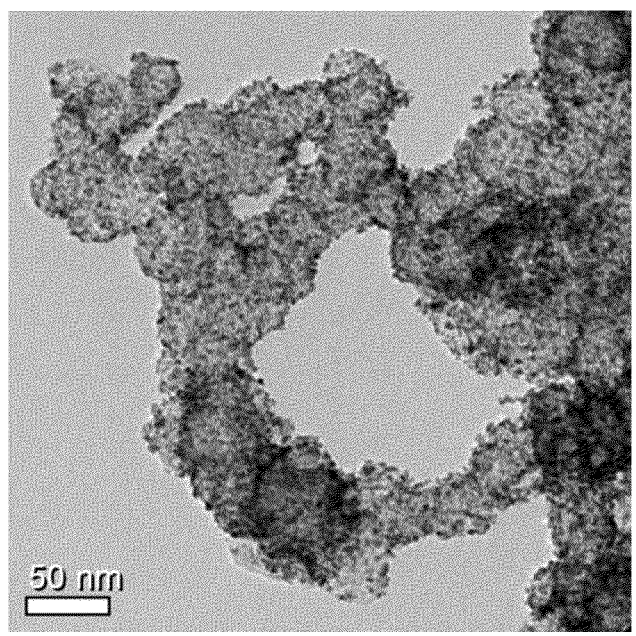

The size of $ZrO_2$ in the supporter according Reference Example 1 and Examples 1 to 3 was measured. The results are shown in FIG. 4. As shown in FIG. 4, as the amount of zirconium (IV) acetylacetonate, i.e., the amount of $ZrO_2$ in the supporter increases, the particle size increases. In FIG. 4, the amount of $ZrO_2$ shown is based upon the weight percentage of zirconium (IV) acetylacetonate used to manufacture the supporter.

TEM Photograph

TEM photographs (400,000-times enlarged) of the supporter according to Reference Example 1 and Examples 1 to 3 are shown in FIGS. 5 to 8, respectively. It can be known from FIGS. 5 to 8 that the bright portions are wider as the amount of zirconium (IV) acetylacetonate is increased. The brighten portions in FIGS. 5 to 8 indicate zirconium oxide so that as the amount of zirconium (IV) acetylacetonate increases, the dispersion ability improves.

Example 7

Pt was supported on the supporter according to Example 4 by a polyol method to prepare a Pt/Zr-carbon black catalyst (Pt/Zr-CB-1).

Example 8

A catalyst (Pt/Zr-CB-500) was prepared by the same procedure as in Example 7, except that the supporter according to Example 5 was used.

Example 9

A catalyst (Pt/Zr-CB-1000) was prepared by the same procedure as in Example 7, except that the supporter according to Example 6 was used.

Comparative Example 1

Pt was supported on a carbon black (CB-1) by a polyol method to prepare a catalyst (Pt/CB-1).

Comparative Example 2

Pt was supported on crystalline carbon black (CB-500), which was prepared by heat-treating the carbon black (CB-1) at 2000° C., by a polyol method, to prepare a catalyst (Pt/CB-500).

Comparative Example 3

Pt was supported on crystalline carbon black (CB-1000), which was prepared by heat-treating the carbon black (CB-1) at 2500° C., by a polyol method, to prepare a catalyst (Pt/CB-1000).

TEM Photograph 500,000-times enlarged TEM photographs of the catalyst according to Example 7 are shown in FIG. 9 and FIGS. 10A to 10D. The TEM photographs in FIG. 9 and FIGS. 10A to 10D were obtained from various surfaces of the catalyst according to Example 7. The photographs indicate that Pt and $ZrO_2$ are uniformly distributed throughout the catalyst.

Measurements of the Catalyst Activity

Figure 11:
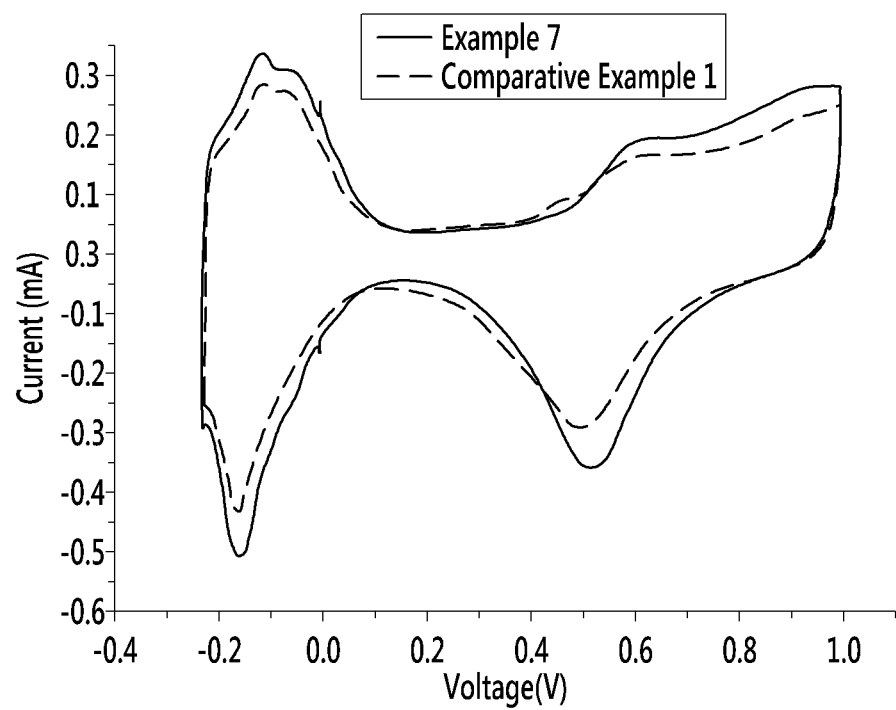
FIG. 11 is a graph exhibiting activities of the catalysts according to Example 7 and Comparative Example 1.
Figure 12:
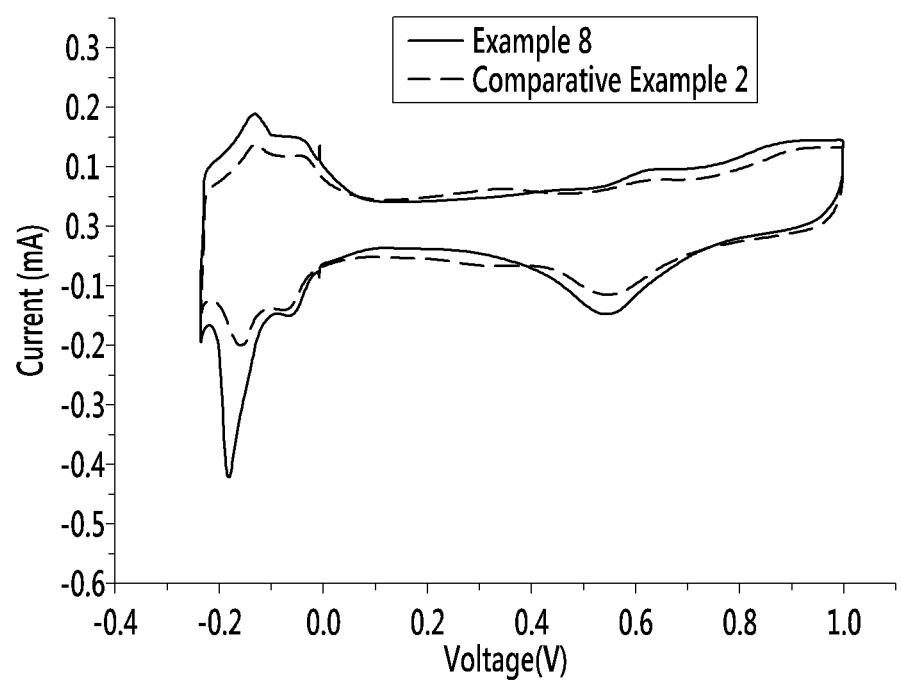
FIG. 12 is a graph exhibiting activities of the catalysts according to Example 8 and Comparative Example 2.

The catalyst activity of the catalyst according to Examples 7 to 9 and Comparative Examples 1 to 3 was measured. The results according to Example 7 and Comparative Example 1 are shown in FIG. 11. The results according to Example 8 and Comparative Example 2 are shown in FIG. 12. The results according to Example 9 and Comparative Example 3 are shown in FIG. 13.

The catalyst activity for each was obtained by a CV (cyclic voltammetry) experiment. At this time, a saturated calomel electrode (SCE) was used as a standard electrode. Furthermore, the working electrode obtained by mixing 50 wt % of the catalyst and 50 wt % of an ionomer in an isopropyl alcohol solvent to prepare a catalyst ink slurry and coating the ink slurry on a glassy carbon rod was used. As a counter electrode, a Pt mesh was used. The CV experiment was performed in an aqueous solution of 0.1 M $HClO_4$ and measured at a scan rate of 10 mV/second.

Figure 13:
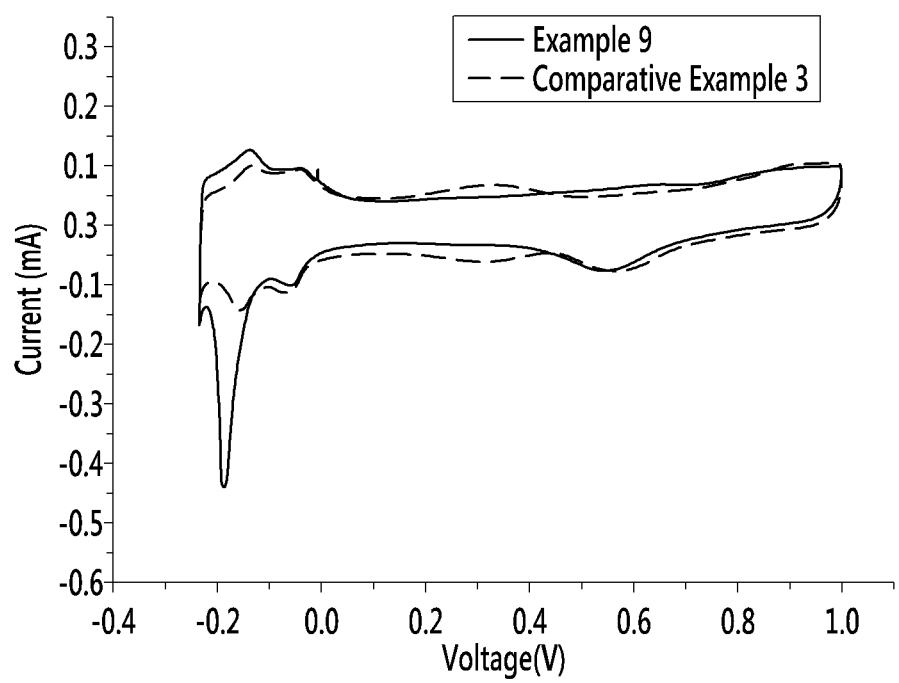
FIG. 13 is a graph exhibiting activities of the catalysts according to Example 9 and Comparative Example 3.

The results from FIGS. 11 to 13 indicated that the catalyst activity according to Examples 7 to 9 is excellent, as compared to Examples 1 to 3, since the graph area of the catalyst according to Examples 7 to 9 is wider than that of Comparative Examples 1 to 3.

Measurements of Activated Surface Areas of Catalyst

The activated surface areas of catalysts according to Example 7 and Comparative Example 1 were measured in an electrochemical experiment. The activated surface area percentages (%) after 1000 cycles were calculated based on 100% of the activated surface area of the catalyst.

Figure 14:
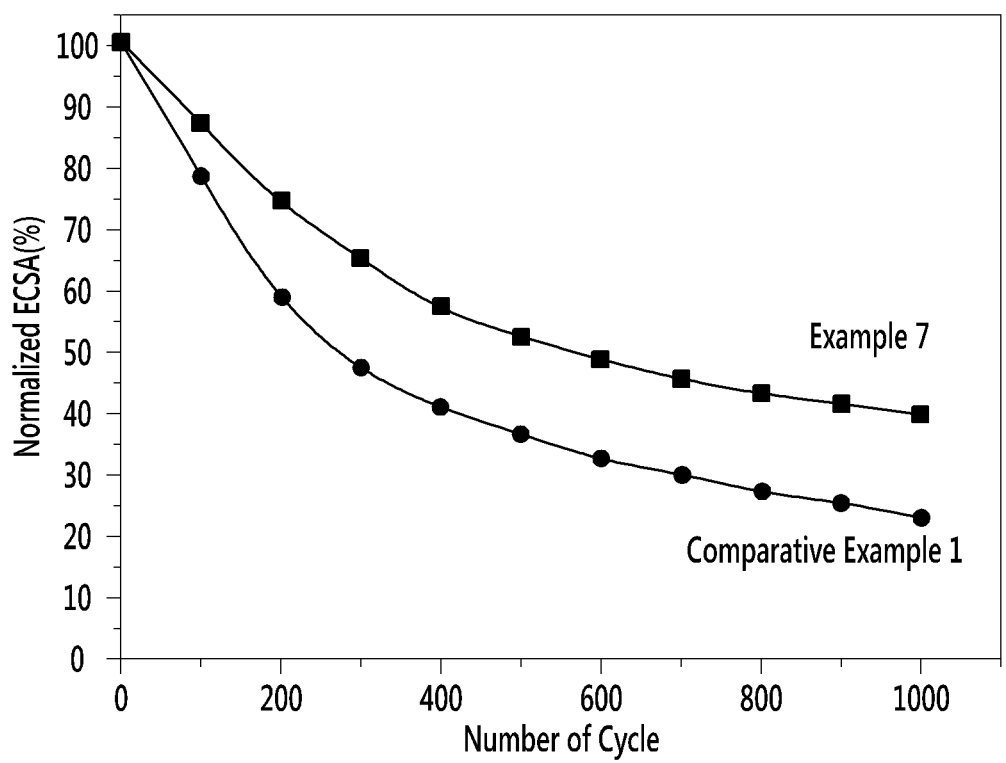
FIG. 14 is a graph exhibiting an active surface area of the catalysts according to Example 7 and Comparative Example 1.

The results are shown in FIG. 14. From FIG. 14, it can be seen that a deterioration ratio of the catalyst according to Example 7 is higher than that according Comparative Example 7. Thus, the catalyst according to Example 7 maintains activity for a long time, as compared to Comparative Example 1.

Example 10

A supporter for a fuel cell was prepared by the same procedure as in Reference Example 1, except that Sn acetylacetonate was used instead of zirconium (IV) acetylacetonate, and the mixing ratio of Sn acetylacetonate and carbon black (CB-1) was about 30 wt %:70 wt %.

Pt was supported on the supporter by the same procedure as in Example 7 to prepare a catalyst.

Example 11

A supporter for a fuel cell was prepared by the same procedure as in Reference Example 1, except that W chloride was used instead of zirconium (IV) acetylacetonate, and the mixing ratio of W chloride and carbon black (CB-1) was about 10 wt %:90 wt %.

Pt was supported on the supporter by the same procedure as in Example 7 to prepare a catalyst.

TEM Photograph

Figure 15:
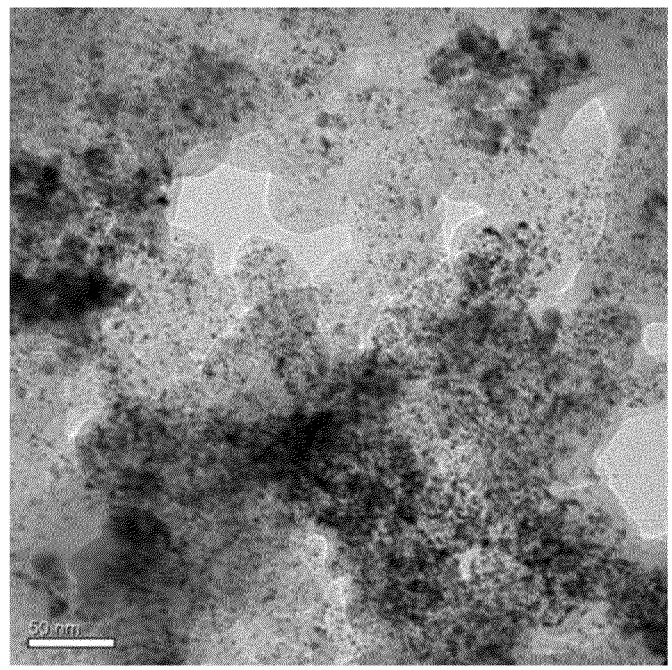
FIG. 15 is a SEM photograph of the catalyst according to Example 10.

A TEM photograph of the catalyst according to Example 10 is shown in FIG. 15. As shown in FIG. 15, Pt and Sn were uniformly distributed throughout the catalyst.

Figure 16:
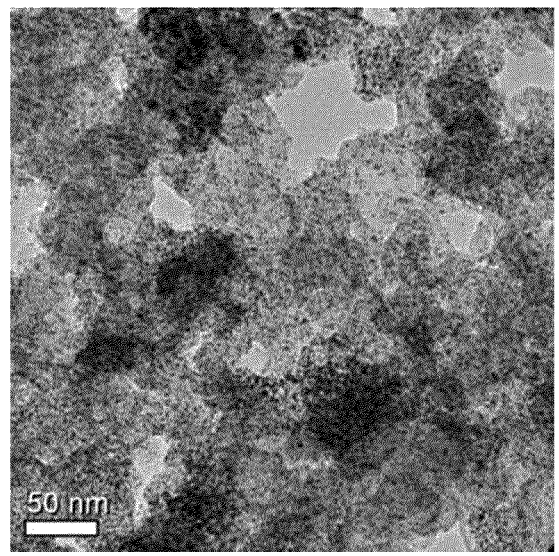
FIG. 16 is a SEM photograph of the catalyst according to Example 11.

Furthermore, FIG. 16 is a TEM photograph of the catalyst according to Example 11. As shown in FIG. 16, Pt and W were uniformly distributed throughout the catalyst.

While this invention has been described in connection with what are presently considered to be practical embodiments, it will be appreciated by those skilled in the art that various modifications and changes may be made without departing from the scope of the present disclosure. It will also be appreciated by those of skill in the art that parts mixed with one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the invention is not limited to the disclosed embodiments, but, on the contrary, is intended to cover various modifications and equivalent arrangements included within the scope of the appended claims, and equivalents thereof.

What is claimed is:

1. A supporter for supporting a catalyst of a fuel cell, comprising:
    a carbonaceous material composed of at least one of denka black, ketjen black, acetylene black, carbon nanofiber, carbon nanowire, and carbon nanoballs; and
    a metal oxide coating layer formed on a surface of the carbonaceous material, the surface of the carbonaceous material covalently bonded with a metal oxide in the metal oxide coating layer,
    wherein the metal oxide is about 4 wt % to about 96 wt % based on 100 wt % of the supporter, and
    wherein the metal oxide is selected from $ZrO_2$, $InO_2$, or a combination thereof.

2. The supporter of claim 1, wherein the metal oxide has an average particle size of about 1.5 nm to about 10 nm.

3. The supporter of claim 1, wherein the metal oxide is a combination of $ZrO_2$ and $InO_2$.

4. An electrode for a fuel cell, comprising:
    a catalyst layer disposed on an electrode substrate, the catalyst layer including the supporter for a fuel cell of claim 1; and
    an active metal supported on the supporter.

5. The electrode of claim 4, wherein the active metal is selected from the group consisting of platinum, ruthenium, osmium, a platinum/ruthenium alloy, a platinum/osmium alloy, a platinum/palladium alloy, a platinum/M alloy and a combination thereof, and wherein M is a transition element selected from the group consisting of Ga, Ti, V, Cr, Mn, Fe, Co, Ni, Cu, Zn, Sn, Mo, W, Rh, Ru, and a combination thereof.

6. The electrode of claim 4, wherein the catalyst layer includes a binder resin.

7. The electrode of claim 4, wherein the binder resin includes a proton conductive polymer resin having a cation exchange group selected from the group consisting of a sulfonic acid group, a carboxylic acid group, a phosphoric acid group, a phosphonic acid group, and derivatives thereof at its side chain.

8. A membrane-electrode assembly for a fuel cell, comprising:
    an anode and a cathode facing each other, at least one of the cathode and the anode is the electrode of claim 4; and
    a polymer electrolyte membrane interposed between the cathode and the anode.

9. The membrane-electrode assembly of claim 8, wherein the at least one of the cathode and the anode comprises an active metal selected from the group consisting of platinum, ruthenium, osmium, a platinum/ruthenium alloy, a platinum/osmium alloy, a platinum/palladium alloy, a platinum/M alloy and a combination thereof, and wherein M is a transition element selected from the group consisting of Ga, Ti, V, Cr, Mn, Fe, Co, Ni, Cu, Zn, Sn, Mo, W, Rh, Ru, and a combination thereof.

10. The supporter of claim 1, wherein the amount of the metal oxide is about 40 wt % to 90 wt % based on 100 wt % of the total supporter.

* * * * *